(12) United States Patent
Ringle et al.

(10) Patent No.: US 10,718,954 B2
(45) Date of Patent: Jul. 21, 2020

(54) MODULAR EYEWEAR

(71) Applicants: Danielle Ringle, Pomona, CA (US);
Zelba Ringle, Pomona, CA (US)

(72) Inventors: Danielle Ringle, Pomona, CA (US);
Zelba Ringle, Pomona, CA (US)

( * ) Notice: Subject to any disclaimer, the term of this patent is extended or adjusted under 35 U.S.C. 154(b) by 180 days.

(21) Appl. No.: 15/707,983

(22) Filed: Sep. 18, 2017

(65) Prior Publication Data

US 2019/0086687 A1    Mar. 21, 2019

(51) Int. Cl.
*G02C 1/08* (2006.01)
*G02C 5/14* (2006.01)

(52) U.S. Cl.
CPC .............. *G02C 1/08* (2013.01); *G02C 5/146* (2013.01); *G02C 2200/02* (2013.01); *G02C 2200/08* (2013.01)

(58) Field of Classification Search
CPC ...... G02C 1/08; G02C 5/146; G02C 2200/08; G02C 2200/02; G02C 9/04; G02C 1/06; G02C 7/02; G02C 13/001
USPC ....... 351/41, 39, 47, 63, 57, 80, 86, 90–102, 351/105, 107, 109, 111, 115, 116, 133, 351/138, 140, 158, 178
See application file for complete search history.

(56) References Cited

U.S. PATENT DOCUMENTS

| 6,375,321 B1 * | 4/2002 | Lee .................. G02C 9/00 351/47 |
| 9,454,017 B2 | 9/2016 | Chen |
| 2005/0001977 A1 * | 1/2005 | Zelman .................. G02C 9/00 351/57 |
| 2007/0132942 A1 * | 6/2007 | Zelazowski .......... G02C 5/2209 351/47 |
| 2007/0236653 A1 * | 10/2007 | Lee ........................ G02C 9/00 351/47 |
| 2007/0273823 A1 * | 11/2007 | Lee ........................ G02C 11/02 351/52 |
| 2009/0195747 A1 | 8/2009 | Insua |
| 2009/0261920 A1 * | 10/2009 | Kawanami ............. H01P 1/387 333/24.2 |
| 2010/0309425 A1 * | 12/2010 | Zelazowski ............ G02C 1/08 351/138 |
| 2014/0104562 A1 | 4/2014 | Kim |
| 2015/0042948 A1 * | 2/2015 | Chung .................... G02C 1/08 351/116 |
| 2016/0377890 A1 * | 12/2016 | Corcoran .............. G02C 11/02 351/52 |
| 2017/0045754 A1 * | 2/2017 | Rubaud ................. G02C 5/146 |
| 2017/0227786 A1 * | 8/2017 | McGinley .............. G02C 1/06 |

(Continued)

*Primary Examiner* — William R Alexander
*Assistant Examiner* — Alberto J Betancourt
(74) *Attorney, Agent, or Firm* — Lynch LLP

(57) ABSTRACT

The inventive subject matter presents novel modular eyewear, having an upper frame, a lower frame, and temple frames. Aspects of the invention include magnetic coupling points. At a first magnetic coupling point, the upper frame, lower frame, and temple frame couple. At a second magnetic coupling, the upper frame and lower frame magnetically couple at the bridge of the frame formed by the upper frame and lower frame. Thus, the present invention enables the upper frame and lower frame to affix a lens for the benefit of the wearer, and also enables greater flexibility, customizability, reduction of wear and tear, and user experience.

9 Claims, 2 Drawing Sheets

(56) References Cited

U.S. PATENT DOCUMENTS

2017/0269383 A1\* 9/2017 Orfahli .................. G02C 1/06
2018/0043083 A1\* 2/2018 Mabray ............... A61M 1/3615

\* cited by examiner

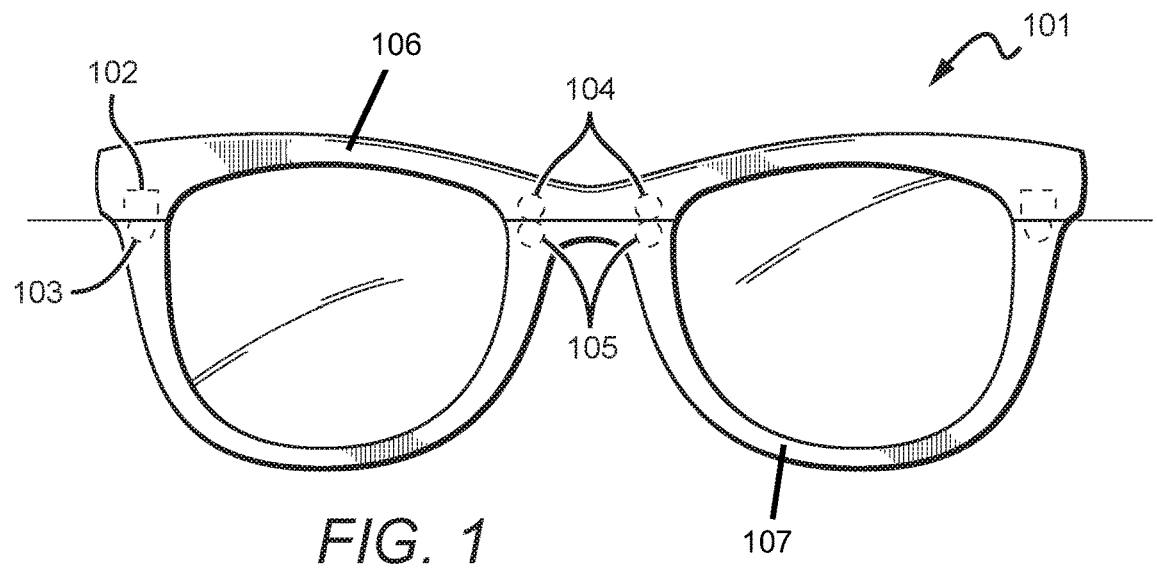
FIG. 1
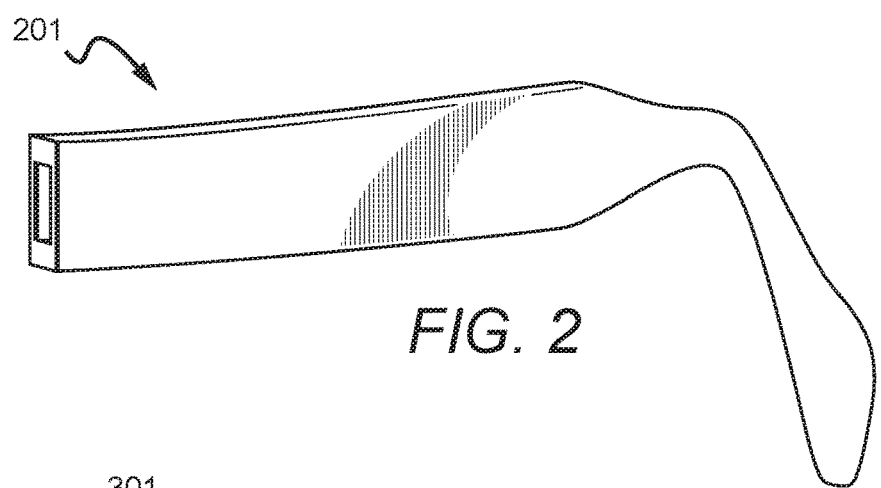
FIG. 2
FIG. 3
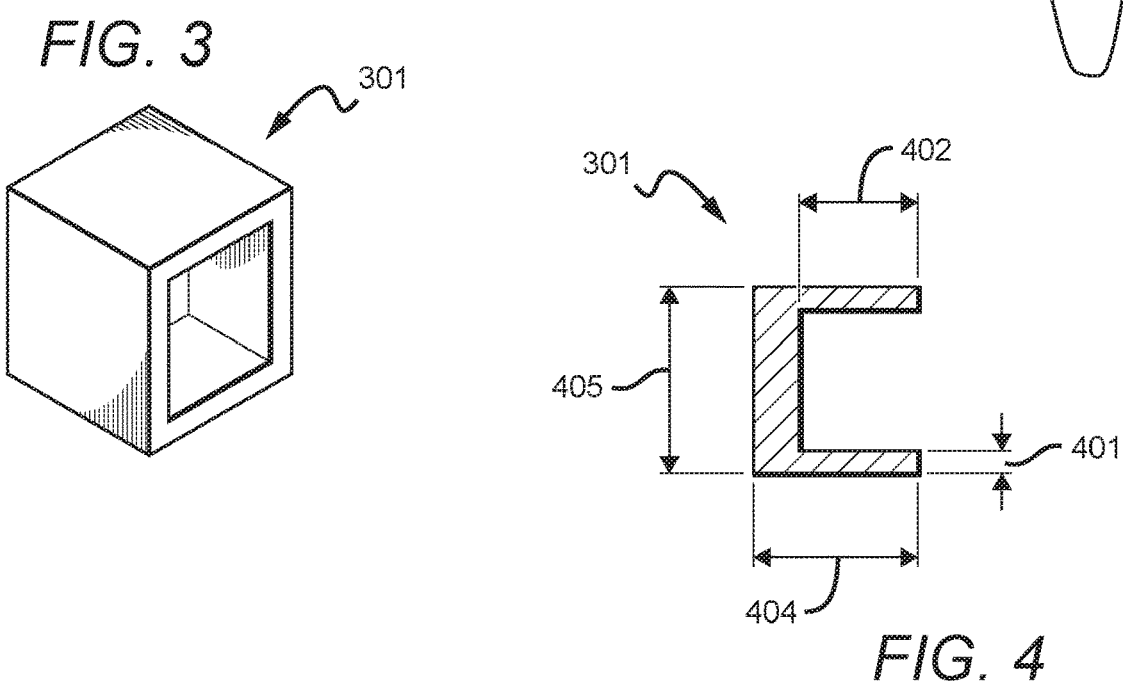
FIG. 4

MODULAR EYEWEAR

FIELD OF THE INVENTION

The field of the invention is modular eyewear.

BACKGROUND

The background description includes information that may be useful in understanding the present invention. It is not an admission that any of the information provided in this application is prior art or relevant to the presently claimed invention, or that any publication specifically or implicitly referenced is prior art.

While many devices exist in the field of modular eyewear, there has yet to exist a device that accomplishes simple disassembly, which achieves, e.g., simple changing of lenses, and re-assembly, in a manner that minimizes the number of parts that may be lost during disassembly and re-assembly and has other advantages that will become apparent in this application.

U.S. Pat. No. 9,454,017, for example, is directed to modular eyewear adapted to quickly release. But the disclosure includes lenses that require a specialized slot to quickly decouple, as well as a decoupling mechanism that includes many parts not designed to enable decoupling without specialized tools or in non-ideal environments. Further, the coupling of the temple frame pieces in the '017 Patent's disclosure are not described to audibly snap, thus failing to provide a human assembler with auditory feedback to confirm assembly.

U.S. Patent Publication No. 2009/0195747 describes temple holders each having recesses formed in the holders that are hinged to the extreme ends of an eyeglass front. This publication fails to teach a fully modular eyewear frame, and also fails to teach a magnetic male end on the temple frame that affixes to a female end on the upper eyewear frame, which enables a hingeless modular eyewear design and, even in cases where a design may include hinges, reduces the wear and tear caused by operating the hinge. Other teachings lacking in this patent publication are evident by comparison to the present invention.

As another example, U.S. Patent Publication No. 2014/0104562, describes affixing a temple frame to the eyewear frame through special design of a hinge. This publication, too, fails to teach a fully modular eyewear frame, and also fails to teach a magnetic male end on the temple frame that affixes to a female end on the upper eyewear frame, which enables a hingeless modular eyewear design and, even in cases where a design may include hinges, reduces the wear and tear caused by operating the hinge. Other teachings lacking in this patent publication are evident by comparison to the present invention.

Thus, the background materials discussed in this application fail to teach or suggest a fully modular eyewear apparatus. For example, the background materials fail to teach a main eyewear frame comprising an upper and a lower portion configured to magnetically couple to affix a lens. Other teachings lacking in the background materials are evident by comparison to the present invention. The invention described in this application provides several advantages over the prior art, including, e.g., enabling reduced wear and tear through elimination or lower use of mechanical hinges, greater customizability, improved user experience, and improved assembly and disassembly.

The foregoing discussion is for background purposes only; it is not an admission that any aspect of the background is prior art.

SUMMARY OF THE INVENTION

The present invention provides modular eyewear with magnetic couplings.

In one aspect of the inventive subject matter, the modular eyewear comprises a top bar, a bottom bar, a right temple frame, a left temple frame, wherein the top bar comprises a top bar left temple portion, a top bar bridge portion, and a top bar right temple portion, wherein the top bar left temple portion comprises a first magnet, wherein the top bar bridge portion comprises a first bridge top bar magnet, wherein the bottom bar comprises a mating bar left temple portion, a mating bridge portion, and a mating bar right temple portion, wherein the mating bridge portion is magnetized, wherein the left temple frame comprises a mating magnetic left temple frame portion, configured to couple with the top bar left temple portion.

In some embodiments, the first magnet has a U-shaped cross-section.

In some embodiments, the U-shaped cross-section is smaller than 4 mm in length and smaller than 4 mm in height.

In some embodiments, the first bridge top bar magnet has an oval-shaped cross section smaller than 4 mm in diameter.

In some embodiments, the mating left temple portion is magnetized.

In another aspect of the inventive subject matter, the top bar bridge portion further comprises a second bridge top bar magnet.

In some embodiments, the mating magnetic left temple frame portion, the mating bar left temple portion, and the top bar left temple portion are configured to magnetically couple at a point.

In another embodiment of the inventive subject matter, modular eyewear comprises an upper frame comprising a left upper magnet, a bridge upper magnet, and a right magnet, a lower frame comprising a left lower magnet, a bridge lower magnet, and a right lower magnet, a right temple frame comprising a mating right temple magnet, a left temple frame comprising a mating left temple magnet, and a lens.

In some embodiments, the left upper magnet, the left lower magnet, and the mating left temple magnet are configured to magnetically couple in a first coupling.

In some embodiments, the right upper magnet, right lower magnet, and mating right temple magnet are configured to magnetically couple in a second coupling.

In some embodiments, the bridge upper magnet and the bridge lower magnet are configured to magnetically couple in a third coupling.

In some embodiments, the first coupling, second coupling, and third coupling are configured to affix the lens between the upper frame and the lower frame.

In another aspect of the inventive subject matter, modular eyewear comprises an upper bar, a lower bar, a temple frame, wherein the upper bar is configured to magnetically couple with the temple frame and the lower bar at a first point, wherein the upper bar is further configured to magnetically couple with the lower bar at a second point, wherein the upper bar and the lower bar form a lens frame when coupled, and wherein the second point is at the bridge of the lens frame.

In some embodiments, the temple frame comprises a right temple frame configured to magnetically couple with the upper bar.

In some embodiments, the right temple frame is further configured to mechanically couple with the upper bar.

In some embodiments, the right temple frame is configured to mechanically couple with a mating portion of the upper bar having a U-shaped cross-section.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1 is a front view of the frame.
FIG. 2 is a perspective view of the temple frame.
FIG. 3 is a perspective view of a temple magnet.
FIG. 4 is a cross-sectional view of the temple magnet.

DETAILED DESCRIPTION

Figure 5:
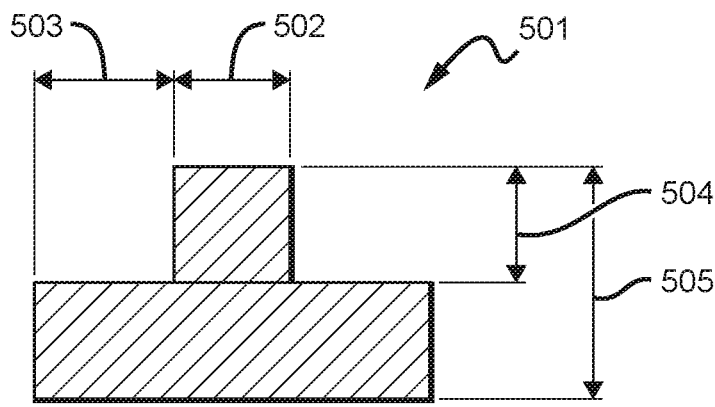
FIG. 5 is a cross-sectional view of a temple frame magnet.

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In one embodiment of the inventive subject matter, modular eyewear comprises a top frame piece, a bottom frame piece, a right temple piece, and a left temple piece. The modular eyewear is configured to permit each piece to easily disassemble or reassemble, such that, when assembled, the top frame piece and bottom frame piece joined together affix lenses between them.

The assembly is accomplished through coupling points at the temples and bridge of the frame. In some embodiments of the inventive subject matter, the coupling point at the temples is accomplished through magnetic and mechanical coupling.

Embodiments of the inventive subject matter will now be described by reference to the Figures.

FIG. 1 depicts the upper frame 106 (also referred to as a top bar or upper bar) and the lower frame 107 (also referred to as a bottom bar or lower bar) coupled together to form frame 101. The coupling is accomplished at a first coupling point, through the magnetic coupling of upper frame temple magnet 102 and lower frame temple magnet 103. The coupling is further accomplished at a second coupling point, through the magnetic coupling of bridge magnets 104 on the upper frame 106 and bridge magnets 105 on the lower frame 107. In some embodiments, the upper frame 106 and lower frame 107 may be configured to audibly snap when coupled.

FIG. 2 depicts the temple frame 201. The temple frame comprises a slot into which a temple frame magnet may be inserted. When the magnet is inserted, the temple frame is configured to couple with frame 101 at the first coupling point. In some embodiments, the temple frame is configured to audibly snap when coupled with frame 101. The temple frame design thus enables modular eyewear that does not require hinges at the temples, enabling cheaper manufacturing and fewer moving mechanical parts that may wear out over time.

FIG. 3 depicts a magnet 301, which is one example of upper frame temple magnet 102. Magnet 301 has a U-shaped cross section, as depicted in FIG. 4. In some embodiments, the U-shaped cross section has particular dimensions at particular points to achieve superior magnetic and mechanical coupling. Although many lengths are contemplated, in some embodiments, lengths 401 are smaller than 1 mm, depth 402 is smaller than 4 mm, height 403 is smaller than 5 mm, length 404 is smaller than 6 mm, and length 405 is also smaller than 6 mm. Lengths 401, 402, 403, 404, and 405 are each sized sufficiently to prevent the material from snapping. In some embodiments, lengths 401 are different on the different sides of the open cube shape formed by magnet 301.

FIG. 5 depicts one example of a temple frame magnet 501 which may be inserted into temple frame 201. Temple frame magnet 501 has a first rectangular prism portion and a second rectangular prism portion, cross-sections of which are depicted in FIG. 5. In some embodiments, the two portions comprise different magnets coupled together through a magnetic and physical, e.g., adhesive, coupling. In some embodiments, upper length 502 is smaller than 3 mm, upper distance 503 is smaller than 4 mm, upper distance 504 is smaller than 3 mm, lower length 505 is smaller than 6 mm. Temple frame magnet 501 is configured to couple with magnet 301, and also to couple with lower frame temple magnet 103.

Figure 6:
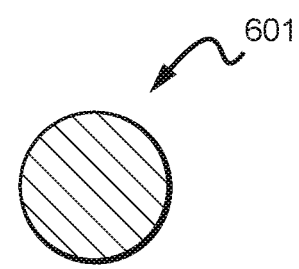
FIG. 6 is a cross-sectional view of a magnet for use as a bridge magnet and lower frame temple magnet.

FIG. 6 depicts one example of disc magnet 601, which in some embodiments may be used as lower frame temple magnet 103 and bridge magnets 104 in both the upper frame 106 and the lower frame 107. In some embodiments, the major diameter of the disc magnet 601 is less than 4 mm.

Figure 7:
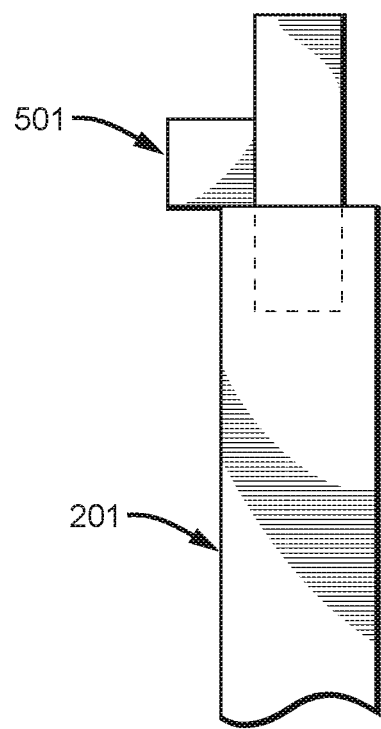
FIG. 7 is a top view of the temple frame coupled with temple frame magnet.

FIG. 7 depicts the temple frame 201 coupled with magnet 301 as the temple frame magnet. The coupling may be accomplished physically, e.g., by addition of an adhesive or special molding process with temple frame 201.

Thus, specific compositions and methods of the invention have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. Modular eyewear, comprising:
a top bar;
a bottom bar;
a right temple frame;
a left temple frame;
wherein the top bar is formed as a single component and comprises a top bar left temple portion, a top bar bridge portion, and a top bar right temple portion;
wherein the bottom bar is formed as a second single component and comprises a bottom bar left temple portion, a bottom bar bridge portion, and a bottom bar right temple portion, and wherein the bottom bar is formed such that the bottom bar left temple portion is coupled with the bottom bar bridge portion by only a first U-shaped member and the bottom bar right temple portion is coupled with the bottom bar bridge portion by only a second U-shaped member;
wherein the top bar bridge portion comprises a top bar bridge portion magnet and the bottom bar bridge portion comprises a bottom bar bridge portion magnet;
a top bar left temple portion magnet disposed at least partially within the top bar left temple portion;
a top bar right temple portion magnet disposed at least partially within the top bar right temple portion;
a bottom bar left temple portion magnet disposed at least partially within the bottom bar left temple portion;
a bottom bar right temple portion magnet disposed at least partially within the bottom bar right temple portion;
wherein the top bar is configured to mate with the bottom bar by coupling the top bar left temple portion magnet with the bottom bar left temple portion magnet and by coupling the top bar right temple portion magnet with the bottom bar right temple portion magnet to create a first lens space and a second lens space;
wherein the top bar left temple portion magnet is cup-shaped and features a first interior space, and the top bar right temple portion magnet is cup-shaped and features a second interior space;
wherein the left temple frame is configured to couple with the top bar left temple portion via the top bar left temple portion magnet; and
wherein the right temple frame is configured to couple with the top bar right temple portion via the top bar right temple portion magnet.

2. The modular eyewear of claim 1, wherein the left and right cup-shaped magnets each have a U-shaped cross-section that is smaller than 5.5 millimeters in length and smaller than 5.5 millimeters in height.

3. The modular eyewear of claim 1, wherein the top bar bridge portion further comprises a second top bar bridge portion magnet.

4. Modular eyewear, comprising:
an upper frame having a front side and a back side;
the upper frame comprising a left cup-shaped magnet, a bridge upper magnet, and a right cup-shaped magnet;
wherein the left cup-shaped magnet is coupled with the upper frame at a left end of the upper frame;
wherein the right cup-shaped magnet is coupled with the upper frame at a right end of the upper frame;
a lower frame comprising a left lower magnet, a bridge lower magnet, and a right lower magnet;
wherein the upper frame is configured to mate with the lower frame such that the left lower magnet couples with the right upper magnet, the right lower magnet couples with the right upper magnet, and the bridge lower magnet couples with the bridge upper magnet;
a right temple frame comprising a mating right temple component configured to mate with the right cup-shaped magnet;
a left temple frame comprising a mating left temple component configured to mate with the left cup-shaped magnet; and
a lens.

5. The modular eyewear of claim 4, wherein the lower frame is formed as a single component and comprises a lower frame left temple portion, a lower frame bridge portion, and a lower frame right temple portion, and wherein the lower frame is formed such that the lower frame left temple portion is coupled with the lower frame bridge portion by only a first U-shaped member and the lower frame right temple portion is coupled with the lower frame bridge portion by only a second U-shaped member.

6. The modular eyewear of claim 4, wherein the right cup-shaped magnet, right lower magnet, and the mating right temple are configured to magnetically couple in a first coupling, and wherein the left cup-shaped magnet, left lower magnet, and the mating left temple are configured to magnetically couple in a second coupling.

7. The modular eyewear of claim 4, wherein the bridge upper magnet and the bridge lower magnet are configured to magnetically couple.

8. The modular eyewear of claim 4, wherein the upper frame and the lower frame are configured to couple with one another such that the lens can be held therebetween.

9. Modular eyewear, comprising:
an upper bar having a front side and a back side;
the upper bar comprising a left cup-shaped magnet, a bridge upper magnet, and a right cup-shaped magnet;
a lower bar;
a temple frame;
wherein the upper bar is configured to magnetically couple with the lower bar, wherein the upper bar and the lower bar form a lens frame when coupled;
wherein the temple frame is configured to magnetically couple with a right side of the upper bar via a cup-shaped magnet affixed to the right side of the upper bar.

* * * * *